Aug. 4, 1953  F. S. MALICK  2,647,601
ELECTROMAGNETICALLY OPERATED FRICTION CLUTCH
Filed June 10, 1950  2 Sheets-Sheet 1

WITNESSES:
Robert Baird
E. F. Oberhein

INVENTOR
Franklin S. Malick.
BY
Paul E. Friedemann
ATTORNEY

Aug. 4, 1953　　　　F. S. MALICK　　　　2,647,601
ELECTROMAGNETICALLY OPERATED FRICTION CLUTCH
Filed June 10, 1950　　　　　　　　2 Sheets-Sheet 2
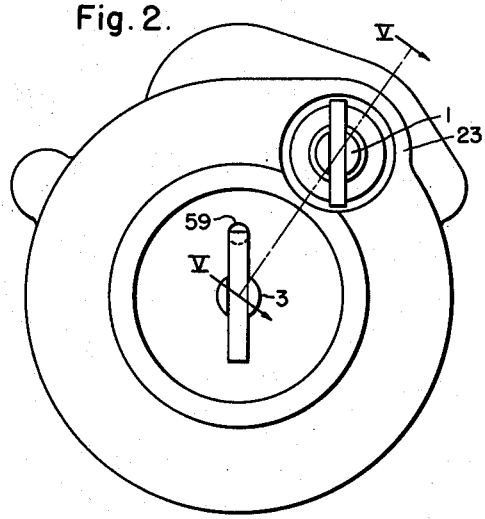
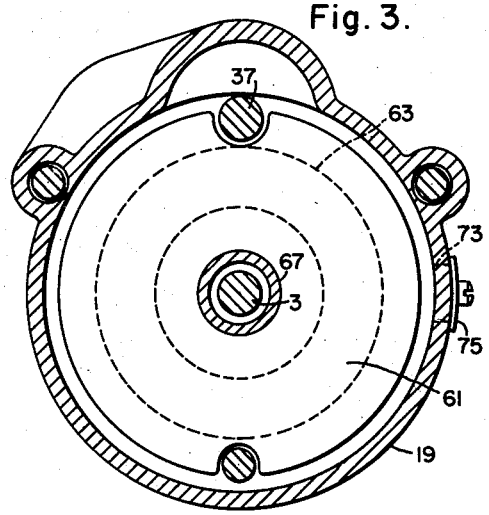
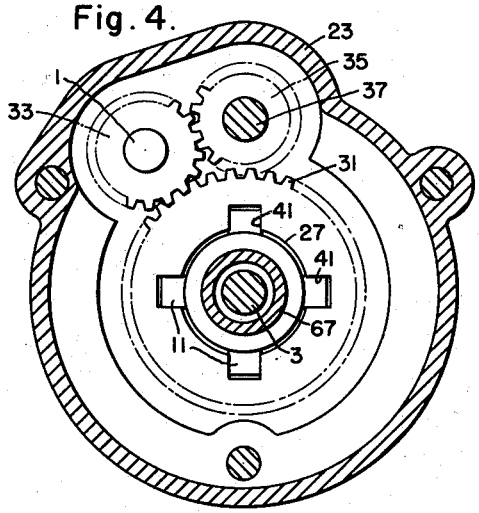
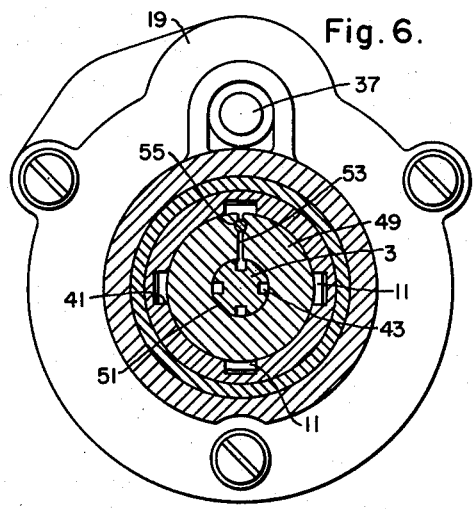
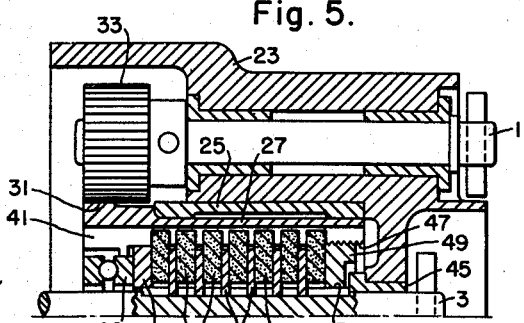
WITNESSES:
Robert C. Baird
E. H. Oberheim
INVENTOR
Franklin S. Malick
BY
Paul E. Friedemann
ATTORNEY Patented Aug. 4, 1953

2,647,601

UNITED STATES PATENT OFFICE 2,647,601

ELECTROMAGNETICALLY OPERATED FRICTION CLUTCH

Franklin S. Malick, Pittsburgh, Pa., assignor, by mesne assignments, to the United States of America as represented by the Secretary of the Navy Application June 10, 1950, Serial No. 167,394

3 Claims. (Cl. 192—84)

This invention relates generally to power transmitting devices, and more in particular to an electromagnetically operated type of friction clutch.

Clutches of this general type especially those operated by means of flat-faced magnets usually require adjustments during their operating life. Thus, a clutch of this type, if not properly designed, will have to be taken apart in order to make adjustments in the spacing between the armature and the core of the magnet in order to obtain the proper airgap setting therebetween as the friction elements of the clutch wear.

One object of this invention is to provide a clutch of this general type which is simple in its elements and positive in operation.

Another object of this invention is to provide a clutch of the character referred to which is easily adjustable without disassembly thereof.

More specifically stated, it is an object of this invention to provide an electromagnetically operated clutch wherein adjusting means is provided in the clutch assembly for resetting the airgap of the magnet, provision being had through suitable openings in the housing to make these adjustments and to measure the airgap which is being set.

The foregoing statements are merely illustrative of the various aims and objects of this invention.

Other objects and advantages will become apparent upon a study of the following disclosure when considered in conjunction with the accompanying drawings in which Figure 1 is a longitudinal sectional view of an electromagnetically operated clutch embodying the principles of this invention;

Figure 2 is an end view of the clutch assembly illustrated in Fig. 1;

Fig. 3 is a sectional view taken on the line III—III of Fig. 1;

Fig. 4 is a sectional view taken on the line IV—IV of Fig. 1;

Fig. 5 is a sectional view taken on the line V—V of Fig. 2; and

Fig. 6 is a sectional view taken on the line VI—VI of Fig. 1.

Figure 1:
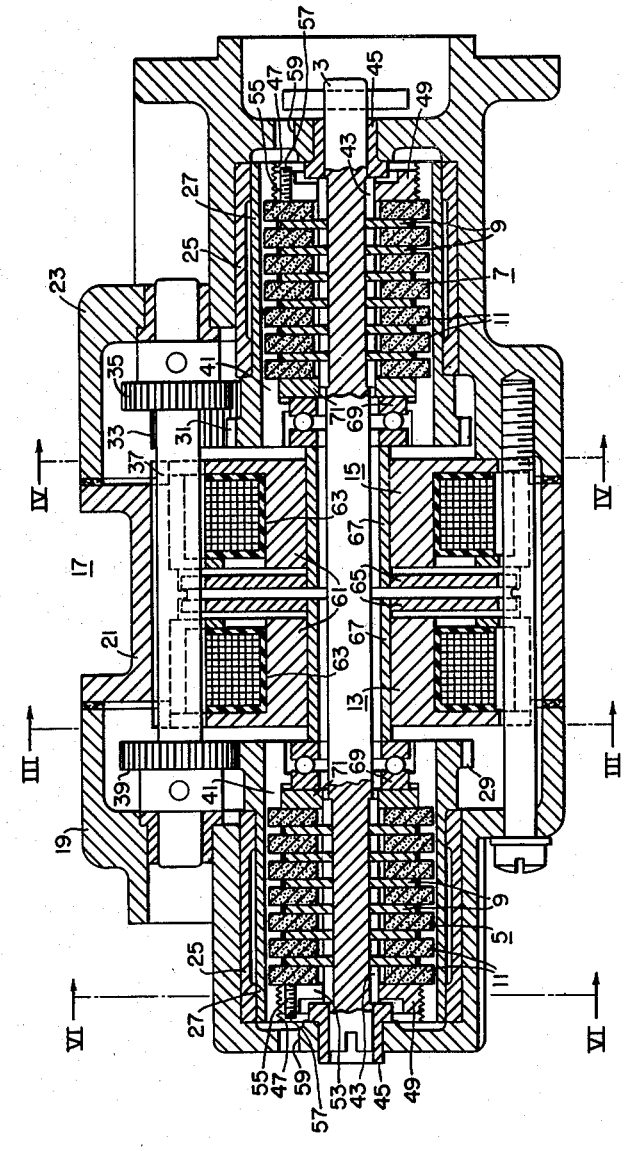

The clutch assembly illustrated in the drawings comprises an input shaft 1 and an output shaft 3. The input shaft 1 in the usual application of this type of clutch is adapted to be driven at a suitable speed by any suitable type of rotating device. For instance, if the clutch forms a part of a servomechanism for controlling a body operable in space, the shaft 1 may be driven through a take-off power system from the main propulsion shaft of the body.

The clutch illustrated affords rotation of the output shaft 3 in both rotational directions, depending upon which of the clutch units 5 or 7 is more tightly engaged. The control of these clutch units which comprise alternate stacks of steel discs 9 and carbon discs 11 is obtained by means of the separate electromagnets 13 and 15, which may be controlled electrically by any suitable means. In the application to the body operable in space, the control means may constitute a position error detector for the body, producing electrical quantities for energizing the clutches in dependence of the angular error in the heading of the body with respect to a predetermined course.

The various components of the clutch are mounted within a three-piece non-magnetic housing, generally designated 17. This housing includes the left-hand housing section 19, a central housing section 21, and a right-hand housing section 23. The left- and right-hand housing sections are suitably faced to present faces of a configuration conforming with the end faces of the central housing section. Each of the left- and right-hand housing sections have press-fitted therein a sleeve bearing 25 which journals a clutch barrel 27. The clutch barrel in the left-hand housing section at its inner extremity is equipped with a spur gear 29, while the clutch barrel member in the right-hand housing section is provided with a similar spur gear at its inner extremity, designated 31. As illustrated more clearly in Fig. 5, the input shaft 1 is provided with a pinion 33 at its inner end, which pinion has an axial length greater than the axial length of the teeth on the spur gear 31. This pinion meshes continuously with the spur gear 31, and additionally meshes with a pinion 35, which is displaced from the spur gear 31 and is mounted upon a quill shaft 37, journaled at its extremities in the left- and right-hand housing sections. Adjacent its point of journaling in the left-hand housing section, quill shaft 37 has attached thereto a second pinion 39 which continuously meshes with the spur gear 29 on the clutch barrel member 27 in the left-hand housing section.

From this arrangement, it will be appreciated that upon rotation of the input shaft 1, rotation of the clutch barrels 27 in the left- and right-hand housing sections obtains and this rotation is in opposite directions.

Each of the clutch barrel members 27 is provided with internal splines 41, best viewed in Fig. 4, which engage cooperating portions of the carbon friction discs 11. Thus, these carbon discs are carried around in rotation with the clutch barrels. The steel discs 9 are secured to the externally splined sections 43 of the output shaft 3 and, therefore, afford a driving connection from the input shaft 1 to the output shaft 3 upon the application of a force axially of the respective stacks of discs to drive the output shaft 3. If only one of the clutches is engaged, it will be appreciated that the output shaft 3 will be rotated in the direction corresponding to the rotation of the engaged clutch. If both of the clutches are engaged, rotation of the output shaft 3 will depend upon the difference of the torques applied thereto by the respective clutches. In the assembly illustrated, the output shaft 3 is journaled at two points in the housing in bearings 45 at the extremities thereof which are press-fitted into the end bells of the housing.

The outer end of each of the clutch barrels is internally threaded over the splines 41 at 47 to threadedly receive the thrust washers 49 therein. The thrust washers 49, as best seen in Fig. 6, are each provided with a central opening 51 which clears the splines on the output shaft 3. The peripheral edge of each thrust washer is threaded to loosely thread into the threaded section 47 at the outer end of the corresponding clutch barrel member. Each thrust washer is radially split at 53 through the outer peripheral edge thereof into the opening 51 and a hole is transversely drilled through the thrust washer through the split 53 and partially tapped to receive a threaded member 55 having a wrench-receiving notch 57 in the outer edge thereof. The partial tapping results in the threads progressively decreasing in depth from the outer face of the thrust washer towards the inner face, giving the effect of a tapered threaded hole, which upon insertion of the threaded member to a given depth spreads the split 53 expanding the thrust washer. The radial disposition of this threaded member or screw 55 corresponds with the radial location of a hole 59 provided through each housing end bell to afford means for inserting a suitable wrench therethrough into the notch or recess 57 of the tapered threaded member. When the threaded member is loosened, the wrench may be left in the hole to secure the thrust washers against rotation with respect to the housing. Thereafter, the input shaft 1 may be rotated, effecting rotation of the clutch barrel. Thus, relative rotation between the clutch barrel and the thrust washer is obtained, resulting in axial displacement of the thrust washer with respect to the clutch barrel, to thereby provide a means of adjustment of the position of the outer end of the respective stacks of friction discs.

Pressure is applied to each stack of friction discs as previously noted by the electromagnets 13 and 15. These electromagnets are each provided with an annular core structure 61 having a central opening therein to adequately clear the output shaft 3, about which each core is concentrically positioned. Each core is generally of C-shaped configuration in section as illustrated and is rigidly secured against movement in any direction when the housing sections are brought together in the manner illustrated. Annular coils 63 are mounted upon each of the cores, and the open sides of the core structures are arranged in confronting relation. Each electromagnet is provided with a separate armature designated 65. These armatures are of the form of discs and are supported concentrically of the shaft 3 on the thrust tubes 67 which are slidably mounted through the central openings in each of the cores. The thrust tubes, at their extremities adjacent the respective friction disc assemblies, engage a thrust bearing 69, the race of which adjacent the stack of discs is keyed to a thrust plate 61 which is slidably fitted within the splines 41 of the corresponding clutch barrel member. This thrust plate engages the end carbon disc which is keyed by the splines 41 to the clutch barrel member to rotate therewith. The arrangement of the armatures and the cores of the respective electromagnets provides axial airgaps therebetween. Hence, upon energization of the coils of these electromagnets, an axial magnetic pull is developed in a direction to compress the respective stacks of discs. Hence, it will be appreciated that the direction of rotation of the output shaft 3 will depend upon which of the electromagnets is energized or alternatively will depend upon the difference in the degree of excitation of the respective electromagnets.

From the foregoing considerations, it will be appreciated that the adjustment of the thrust plate 49 in one direction or the reverse axially of the clutch assembly affects a change in the dimension of the airgap of the corresponding electromagnets. This dimension may be measured through an opening 73 (see Fig. 3) through the central housing section 21, the opening being of a sufficient dimension in a direction axially of this central section of the housing to straddle both of the airgaps of the two electromagnets. Hence, by removal of a cover plate 75 which fits over this opening, a feeler gauge may be inserted through this opening into the respective airgaps of the electromagnets. Hence, after the clutch is assembled, by inserting a feeler gauge into one of the airgaps and loosening one of the screws 55 by insertion of a suitable wrench through the corresponding opening 59 and thereafter holding the thrust plate 49 against rotation, rotation of the input shaft 1 will result in axial movement of the thrust plate 49, presently under consideration. This results in a variation of the airgaps defined between the respective cores and armatures which airgaps may be repeatedly tested for size by inserting the feeler gauge therein. When the gap is properly set, the screw 55 is threaded back into locking position to expand the thrust plate in the clutch barrel and securely lock this thrust plate in position with the airgap properly set.

It will be appreciated by those skilled in the art that numerous variations in details of the arrangement of the parts may be made without departing from the spirit and scope of this invention. Hence, it is intended that the foregoing descriptive disclosure and the showings of the drawings shall be considered only as illustrative of the principles of this invention and not interpreted in a limiting sense.

I claim as my invention:

1. In a friction clutch, the combination of, a substantially closed stationary housing, an internally splined clutch barrel rotatably mounted in said housing, an externally splined shaft rotatably mounted in said housing concentrically of said barrel, a plurality of discs alternately splined to said shaft and said barrel, a thrust member having an opening therethrough fitted over said shaft and threaded into the end of said barrel, said thrust member having a radial slot through the outer peripheral edge thereof into said opening, a threaded expansion member fitted into said slot in a direction paralleling the axis of said shaft, said housing having an opening therethrough aligned with said threaded member in one angular position thereof to receive therethrough an operating member for said threaded member, means for rotating said barrel, an electromagnet having a core structure stationarily supported in said housing and an armature, a tubular member slidably supported through said core structure and concentrically disposed of said shaft, one end of said tubular member terminating adjacent the end of said plurality of discs opposite from said thrust member, a thrust bearing disposed between said one end of said tubular member and said plurality of discs, means securing said armature to the other end of said tubular member in spaced relation with said core structure to define an airgap axially of said shaft, said housing having an opening at a side of said airgap and aligned therewith for receiving therethrough a feeler gauge insertable into the side of said airgap for measuring the size of said airgap.

2. In a friction clutch assembly, the combination of, a substantially closed stationary housing, a clutch barrel member rotatably mounted in said housing, said barrel member being internally splined, an externally splined shaft rotatably mounted in said housing and concentrically disposed of and extending through said clutch barrel member, a plurality of discs fitted over said shaft and alternately splined with said shaft and said barrel member, a thrust member having an opening therein and fitted over said shaft and threaded into one end of said barrel member into engagement with one end of said plurality of discs, said thrust member being split through the peripheral edge thereof into said opening, a threaded expansion member threaded into said split for spreading said thrust member into secure frictional engagement with said barrel member, said housing having an opening therethrough aligned with said threaded member in one angular position of said threaded member for receiving an operating member for said threaded member, an annular electromagnet supported in said housing at the other end of said plurality of discs concentrically of said clutch, clutch operating means slidably mounted through said electromagnet in engagement with said other end of said plurality of discs, a disc-shaped armature member secured to said clutch operating means in a position spaced from the side of said electromagnet remote from said plurality of discs to form a small axial airgap, said housing having an opening therethrough through which a feeler gauge is insertable into said airgap for measuring said airgap and relative movement between said barrel member and said thread member varying said airgap.

3. In a friction clutch, the combination of a substantially closed housing, an internally splined clutch barrel rotatably mounted in said housing, an externally splined shaft rotatably mounted in said housing concentrically of said barrel, a plurality of discs alternately splined to said shaft and said barrel, a thrust member fitted over said shaft and threaded into an end of said barrel, means for locking and unlocking said thrust member to said barrel, said housing having an opening therethrough aligned with said locking means in at least one position of said thrust member relative to said housing, said opening being adapted to receive therethrough means for locking and unlocking said locking means, means for rotating said barrel, an electromagnet having a core structure stationarily supported in said housing and an armature, a tubular member slidably supported through said core structure and concentrically disposed of said shaft, one end of said tubular member terminating adjacent an end of said plurality of discs opposite from said thrust member, a thrust bearing disposed between said one end of said tubular member and said plurality of discs, means securing said armature to the other end of said tubular member in spaced relation with said core structure to define an airgap axially of said shaft, said housing having on opening at a side of said airgap and aligned therewith for receiving therethrough a feeler gauge insertable into the side of said airgap for measuring the size of said airgap.

FRANKLIN S. MALICK.

References Cited in the file of this patent

UNITED STATES PATENTS

| Number | Name | Date |
|---|---|---|
| 321,755 | Polk | July 7, 1885 |
| 762,622 | Eastwood | June 14, 1904 |
| 1,706,600 | Dorman | Mar. 26, 1929 |
| 1,746,365 | Schunemann | Feb. 11, 1930 |
| 2,394,104 | Rankin | Feb. 5, 1946 |
| 2,405,642 | Corte | Aug. 13, 1946 |
| 2,463,859 | Engstrom | Mar. 8, 1949 |
| 2,573,135 | Gerst | Oct. 30, 1951 |